(12) United States Patent
Kawai et al.

(10) Patent No.: US 10,904,185 B1
(45) Date of Patent: Jan. 26, 2021

(54) EMAIL ADDRESS VALIDATION

(71) Applicant: Twilio Inc., San Francisco, CA (US)

(72) Inventors: Scott Kawai, Mission Viejo, CA (US);
Victor Andres Amin, Denver, CO (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 16/690,025

(22) Filed: Nov. 20, 2019

(51) Int. Cl.
| | |
|---|---|
| *H04L 12/58* | (2006.01) |
| *G06Q 10/10* | (2012.01) |
| *G06N 5/04* | (2006.01) |
| *G06N 7/00* | (2006.01) |
| *G06N 3/00* | (2006.01) |
| *G06N 5/02* | (2006.01) |
| *G06N 20/00* | (2019.01) |

(52) U.S. Cl.
CPC .............. *H04L 51/12* (2013.01); *G06N 3/008* (2013.01); *G06N 5/02* (2013.01); *G06N 5/04* (2013.01); *G06N 7/005* (2013.01); *G06N 20/00* (2019.01); *G06Q 10/107* (2013.01); *H04L 51/28* (2013.01)

(58) Field of Classification Search
CPC ......... H04L 51/12; H04L 51/28; G06N 20/00; G06N 3/008; G06N 5/02; G06N 5/04; G06N 7/005; G06Q 10/107

USPC ........................................................ 709/206
See application file for complete search history.

(56) References Cited

U.S. PATENT DOCUMENTS

| | | | |
|---|---|---|---|
| 2014/0358939 A1* | 12/2014 | Simon ................ | G06F 16/24578 707/748 |
| 2015/0379888 A1* | 12/2015 | Hill .......................... | G09B 7/06 434/236 |
| 2020/0092257 A1* | 3/2020 | Goldstein ........... | H04L 63/0236 |

* cited by examiner

*Primary Examiner* — Glenford J Madamba
(74) *Attorney, Agent, or Firm* — Schwegman Lundberg & Woessner, P.A.

(57) ABSTRACT

Methods, systems, and computer programs are presented for validating if an email address is a valid email address. The validation includes a combination of rules-based heuristics (e.g., non-existing domain name) and a validity score calculated by a machine-learning model. The machine-learning model makes predictions based on the training data set that includes historical information about email addresses. The information obtained from the rules and the validity score is combined to determine the probability that the email address is a valid email address.

20 Claims, 14 Drawing Sheets

| Key or Index | Type Value |
|---|---|
| ▼ Root | 1 item |
| ▼ result | 5 items |
| email | joe@mailinator.com |
| verdict | Invalid |
| score | 0.111 |
| verdict | joe |
| score | mailinator.com |
| ▼ checks | 3 items |
| ▼ domain | 3 items |
| valid_syntax | false |
| mx_or_record | false |
| suspected_disposbl | true |
| ▼ local_part | 1 item |
| suspected_role_addr | false |
| ▼ additional | 2 items |
| known_bounces | false |
| suspected_bounces | false |
| ip_address | 4.31.56.2 |

| Key or Index | Type | Value |
|---|---|---|
| ▼ Root | ≡ | 1 item |
| ▼ result | ≡ | 8 items |
| email | A | johndoe@gmial.com |
| verdict | A | Risky |
| score | 42 | 0.00001 |
| local | A | johndoe |
| host | A | gmial.com |
| suggestion | A | gmail.com |
| ▶ checks | ≡ | 3 items |
| ip_address | A | 4.31.56.2 |

FIG. 7

| Key or Index | Type Value | |
|---|---|---|
| ▼ Root | | 1 item |
| ▼ result | | 7 items |
| email | A | scottka@gmail.com |
| verdict | A | Invalid |
| score | 42 | 0.96598 |
| verdict | | scottka |
| score | | gmail.com |
| ▼ checks | | 3 items |
| ▼ domain | | 3 items |
| valid_syntax | ☑ | true |
| mx_or_record | ☑ | true |
| suspected_disposbl | ☑ | false |
| ▼ local_part | | 1 item |
| suspected_role_addr | ☑ | false |
| ▼ additional | | 2 items |
| known_bounces | ☑ | false |
| suspected_bounces | ☑ | false |
| ip_address | A | 4.31.56.2 |

| Key or Index | Type Value | |
|---|---|---|
| ▼ Root | | 1 item |
| ▼ result | | 7 items |
| email | A | scottka@sendgrid.com |
| verdict | A | Invalid |
| score | 42 | 0.68174 |
| verdict | | scottka |
| score | | sendgrid.com |
| ▼ checks | | 3 items |
| ▼ domain | | 3 items |
| valid_syntax | ✓ | true |
| mx_or_record | ✓ | true |
| suspected_disp... | ✓ | false |
| ▼ local_part | | 1 item |
| suspected_role... | ✓ | false |
| ▼ additional | | 2 items |
| known_bounces | ✓ | false |
| suspected_bou... | ✓ | false |
| ip_address | A | 4.31.56.2 |

EMAIL ADDRESS VALIDATION

TECHNICAL FIELD

The subject matter disclosed herein generally relates to methods, systems, and machine-readable storage media for validating information.

BACKGROUND

Companies often collect email addresses from potential new users, such as in response to an online add or from a user that visited the company's website. However, many times users do not enter a correct email address, e.g., the user just wants to get some information but does not want to share personal identification. Further, users sometimes make mistakes when entering their email addresses.

It has been estimated that about 8% of email addresses entered on websites are invalid, stale, or misspelled. When companies prepare marketing campaigns via email, invalid email addresses decrease deliverability, user engagement, and overall return on investment for the money spent on the campaign. Sending emails to wrong addresses also decreases the reputation of the sender among email service providers, which may make it difficult for the sender to send emails in the future.

Marketeers want to maintain a high sending reputation, so it is important that the email addresses of the marketing campaigns are of high quality, at least valid. However, as the number of email addresses in the marketeers list grows, so does the number of invalid email addresses in the list, putting the marketeers' reputations at risk.

BRIEF DESCRIPTION OF THE DRAWINGS

Various ones of the appended drawings merely illustrate example embodiments of the present disclosure and cannot be considered as limiting its scope.

FIG. 6 shows results after validating a disposable email address, according to some example embodiments.

FIG. 7 shows results after validating an email address with a typo in the domain name, according to some example embodiments.

FIG. 8 shows results after validating a valid email address, according to some example embodiments.

FIG. 9 shows results after validating another email address, according to some example embodiments.

DETAILED DESCRIPTION

Example methods, systems, and computer programs are directed to validating if an email address is a valid email address. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, methods, systems, and computer programs are presented for validating email addresses. The validation includes a combination of rules-based heuristics (e.g., non-existing domain name) and a validity score calculated by a machine-learning model. The machine-learning model makes predictions based on the training data set that includes historical information about email addresses. The information obtained from the rules and the validity score is combined to determine the probability that the email address is a valid email address.

Figure 1:
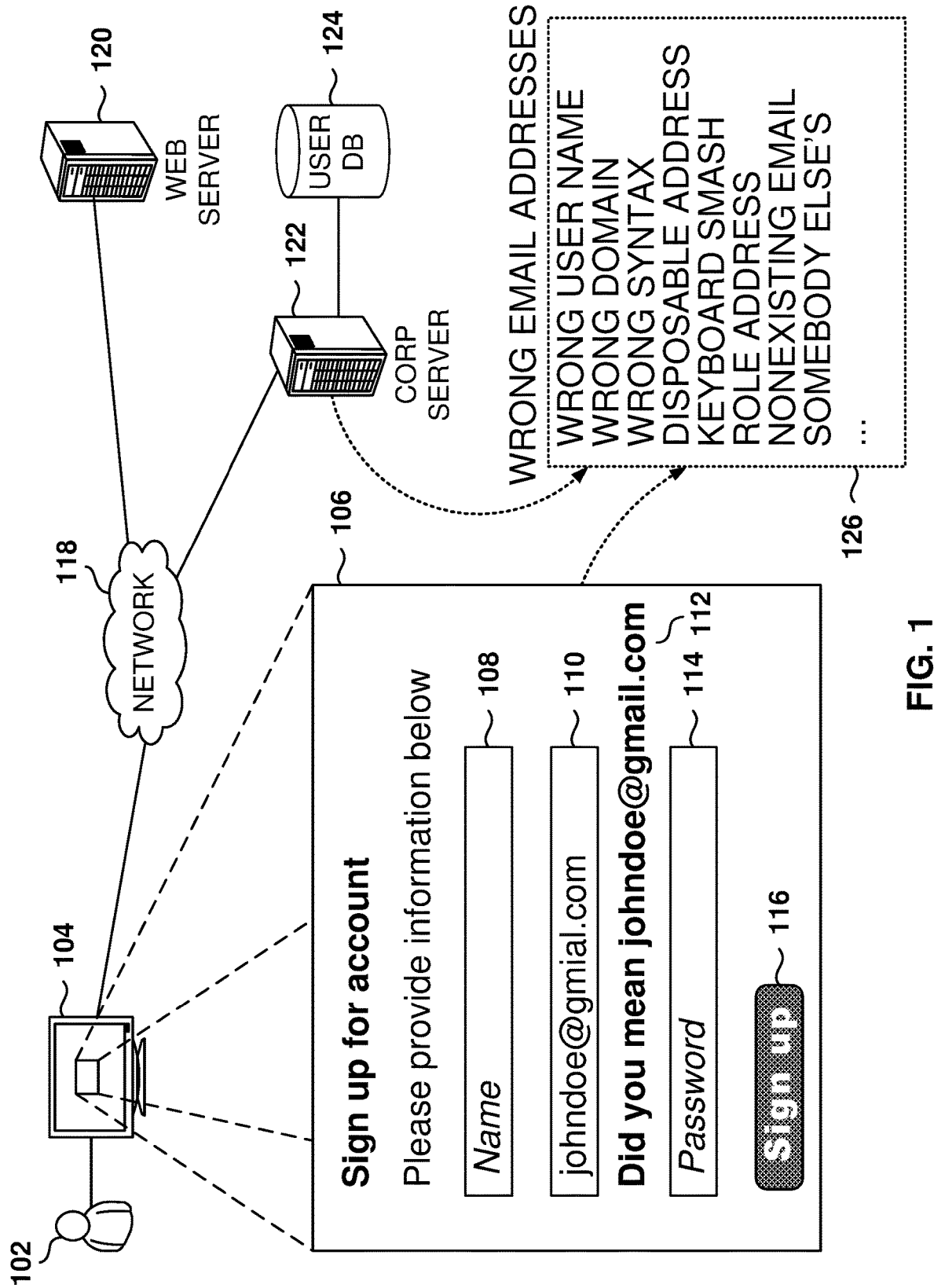
FIG. 1 illustrates a process for capturing new email addresses, according to some example environments.

FIG. 1 illustrates a process for capturing new email addresses, according to some example environments. A user 102, using computer device 104, interacts with a webpage 106 provided by web server 120 to sign up for an account. Once the user information is captured, the information is provided to a corporate server 122, belonging to a company that stores the data in a user database 124.

The webpage 106 includes fields for entering the name of the user 108, an email address of the user 110, and a password 114. Once the user enters the information, the user can select the sign-up button 116 to complete the transaction.

However, many times, users enter an invalid email address, voluntarily or by accident, because of many possible reasons, such as wrong name on the email address, wrong domain on the email address, wrong email address syntax (e.g., missing @ sign), the use of a disposable address that is valid only for a limited time, a keyboard smash (e.g., user enters letter at random followed by a valid email domain), use of generic role addresses (e.g., legal@companyA.com), entering a non-existing email address, entering somebody else's email address, etc. Invalid email addresses lead to bounced emails and bounced emails lead to poor email-delivery performance, such as when reaching out to customers with promotional materials.

If the webpage can validate the email address 110 as the user enters the email address 110, then the webpage can provide a message 112 indicating that the email address is incorrect. In this example, the user has entered the wrong email domain "gmial.com" instead of the "gmail.com," and the message 112 "Did you mean johndoe@gmail.com" is presented as a hint to the user to correct the mistake.

Sometimes, the webpage 106 may also include a validation email address field to have the user enter the email address for a second time in order to reduce the number of mistakes. However, this type of solution requires additional work from the user and decreases user satisfaction, which may cause the user to quit the sign-up operation. By using the email address validation service, a marketeer can reduce the number of incorrect email addresses captured.

Figure 2:
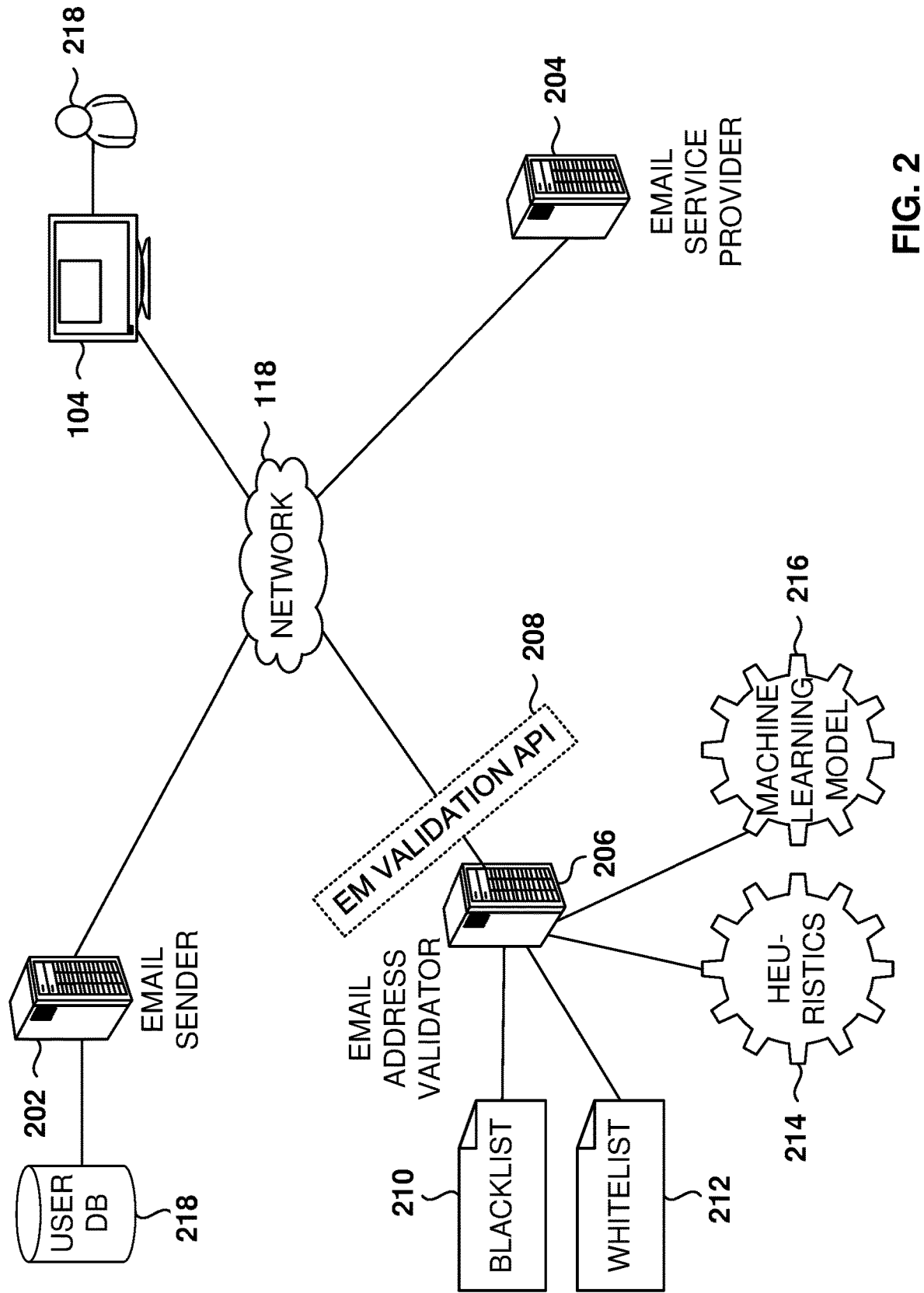
FIG. 2 is an architecture for validating email addresses, according to some example embodiments.

FIG. 2 is an architecture for validating email addresses, according to some example embodiments. An email-address validator 206 provides an email-address validation application programming interface (API) 208 to allow users of the email-address validation service to check if the given email address is valid.

A user, referred to herein as a marketeer 218, uses a send mail service to send emails to customers. The send-mail services are provided by the email sender 202, which has access to a user database 218 containing user information, including users email addresses. The emails are then sent by the email sender 202 to a plurality of email service providers 204 (e.g., Gmail, Hotmail).

The email-address validator 206 includes a blacklist 210 with invalid or undesired email addresses and a whitelist 212 with a list of known valid and desired email addresses. Further, the email-address validator 206 utilizes heuristics 214 and one or more machine learning models 216 for validating email addresses.

In some example embodiments, the email sender 202 and the email address validator 206 are services provided by the same organization. The machine-learning model 216 is trained with the historic data captured by the email sender 202 over time (e.g., email bounces). It is noted that the email sender 202 sends a large number of emails each day (e.g., two billion emails per day) so the amount of data accumulated is large. In some cases, only a subset of the historical data is used for training the machine-learning model 216. In other example embodiments, a different machine-learning model is provided for each client of the email sender, and the data for each client is then used to train the machine-learning model.

One of the advantages of the machine-learning model 216 is that it is configured to detect invalid email addresses so that the marketeer 218 can eliminate those invalid email addresses from the sending list. For example, the machine-learning model 216 is accurate when predicting a keyboard smash, providing a low validity score when an address is suspected of being a keyboard smash. The machine-learning model 216 is also accurate in detecting typographical errors when entering the email address. Additionally, the machine-learning model 216 may provide a suggestion to correct typographical errors when entering email addresses (e.g., "gmail.com" instead of "gmial.com", missing @ sign).

The email-validation API 208 is a real-time service that can validate an email address quickly. Therefore, the email-address validation service can be used to check for the correctness of the email addresses as they are entered by users. For example, the email-address validation may be used during the sign-up process to check for correct syntax, as illustrated in FIG. 1.

The email-address validation service can also be used to validate email addresses already entered by users, or as a batch service to validate a plurality of email addresses.

Some email-address validation solutions utilize the broken SMTP (simple mail transfer protocol) handshake. The SMTP handshake involves a sender sending a request to the email service provider 204 to check if an email address is valid. After the email service provider 204 returns the result of the check for validity, the email sender does not continue with the sending of the email and stops there.

The problem with the broken SMTP handshake is that it is a technique commonly used by spammers and phishers; email service providers are beginning to take counter measures, such as providing false information to avoid spammers and phishers. Therefore, the broken SMTP handshake is not a reliable method of validating email addresses.

Figure 3:
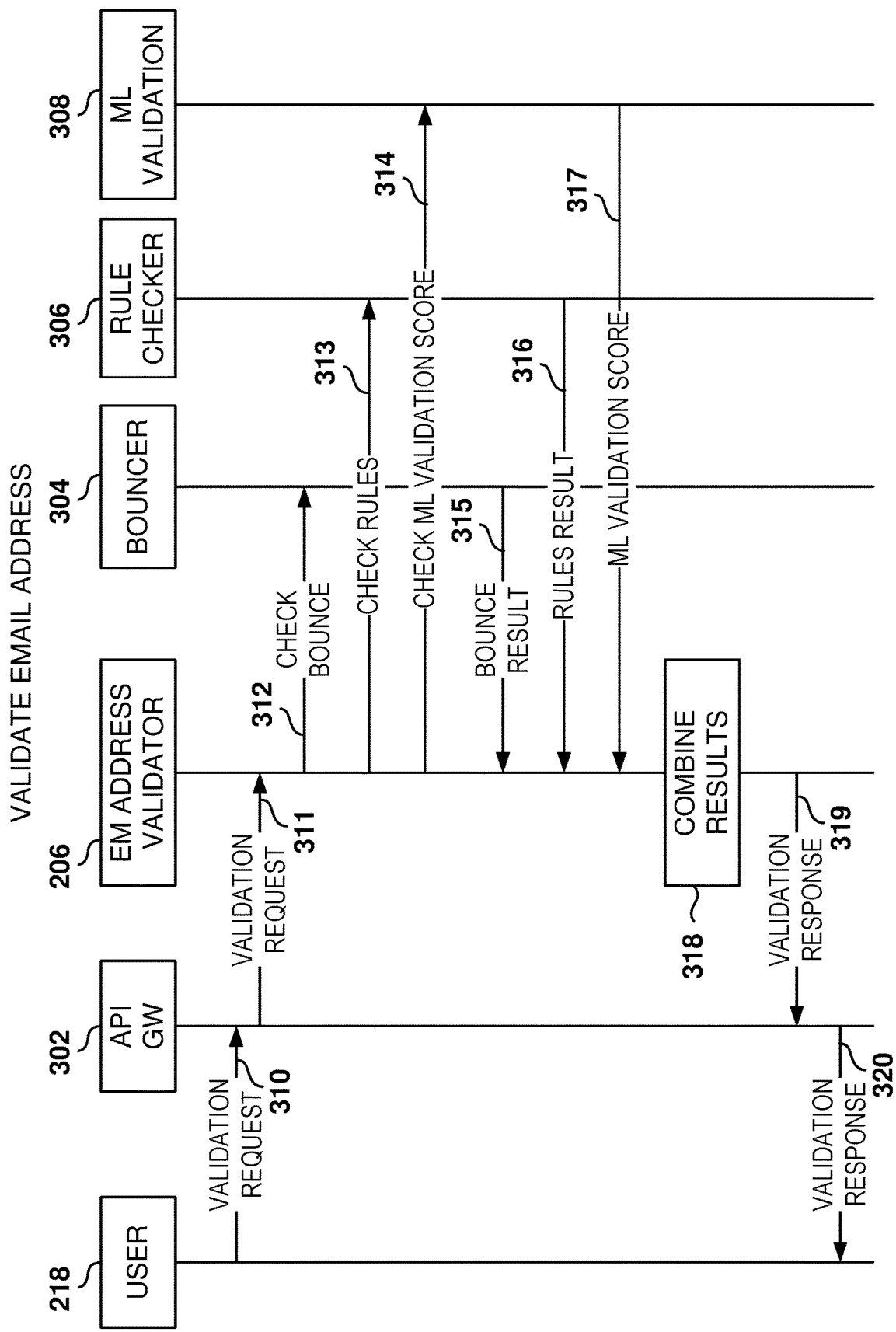
FIG. 3 illustrates the process for validating an email address, according to some example embodiments.

FIG. 3 illustrates the process for validating an email address, according to some example embodiments. The user 218 sends a validation request 310 to an API gateway 302 to validate an email address. The API gateway 302 is a device that queues the request for the email address validator 206.

The API gateway 302 forwards 311 the validation request to the email-address validator 206. The email-address validator 206 then sends three different requests to three different systems that perform checks on the email address. The three systems are a bouncer 304 (also referred to herein as a bounce checker), a rule checker 306, and a machine-learning model 308. The three requests may be processed in parallel or serially.

The bouncer 304 checks for bounced emails received by the email sender service. The rule checker 306 applies a plurality of rules to determine if an email address is invalid. The rules might be configured by the administrator and include rules such as missing @ sign, missing domain (e.g., ".com"), invalid domain, address in blacklist, address for a domain that provides disposable email addresses, role address (e.g., hr@corporationA.com), etc. Further, the machine-learning model checks for invalid email addresses. More details are provided below with reference to FIG. 10 about the machine-learning model.

The email-address validator 206 sends a check-bounce request 312 to the bouncer 304, which returns a bounce result 315 indicating if the email address has bounced before. The email-address validator 206 sends a request 313 to the rule checker 306 to apply the rules to the email address in the request 313. Further, the email-address validator 206 sends a request 314 to the machine-learning validation model 308 to check the email address, and the machine-learning model 308 returns 317 the machine-learning model validation score.

In some example embodiments, the machine-learning model 308 produces a risk score from 0 to 1, where the score is interpreted as the probability that an email address is invalid. A high score indicates a high likelihood that the email address is invalid. In other example embodiments, the score indicates the probability that the email address is a valid email address.

At operation 318, the email-address validator 206 combines the results received from the bouncer 304, the rule checker 306, and the machine-learning model 308, and returns the validation response 319 to the API gateway 302, which then forwards the validation response 322 to the user 102. The validation response 322 includes a score indicating the probability that the email address is invalid. In other example embodiments, the score indicates the probability that the email address is valid.

In some example embodiments, combining the information from the different modules for address validity involves calculating the invalidity probability score, such that if any module determines a high probability of invalidity, the result will also be a high probability of invalidity, independently of whether other modules determine a low probability of invalidity. In other words, if one module flags the email address as invalid, the email address is determined to have a high probability of being invalid, even if the other modules do not flag the email as invalid.

Figure 4:
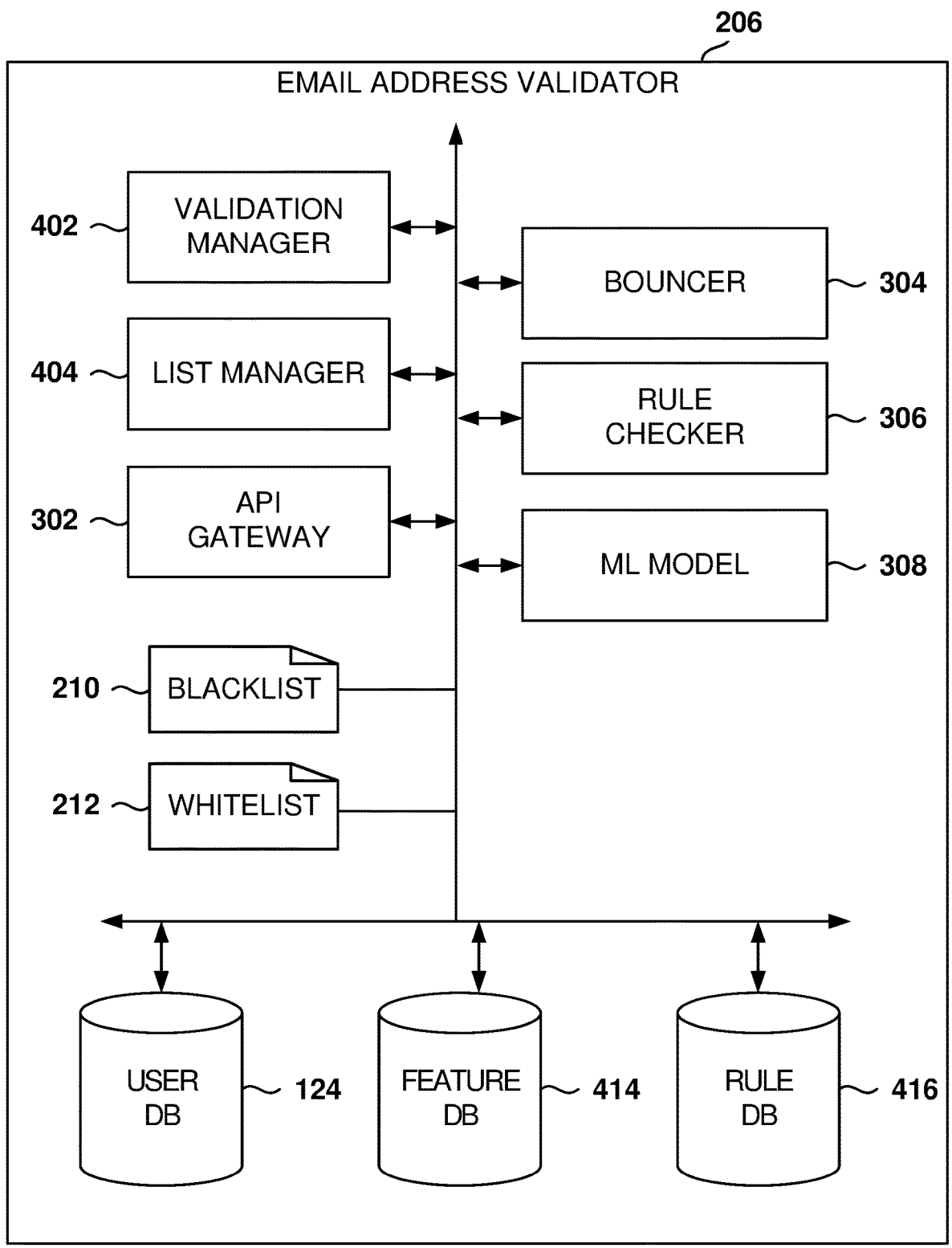
FIG. 4 illustrates the components of the email address validator, according to some example embodiments.

FIG. 4 illustrates the components of the email address validator 206, according to some example embodiments. In some example embodiments, the email-address validator 206 includes a validation manager 402, a list manager 404, the API gateway 302, the bouncer 304, the rule checker 306, the machine-learning model 308, and a plurality of databases.

The validation manager 402 supervises the email-validation operations and the interactions between the different modules. The validation manager 402 also provides user interfaces for accessing or configuring the email-validation service. The list manager 404 manages the operation of the blacklist 210 and the whitelist 212, such as adding, modifying, or deleting email addresses from the lists.

The databases include the blacklist 210, the whitelist 212, the user database 124, a feature database 414, and a rule database 416. The feature database 414 includes values for the features utilized for the training of the machine-learning model 308. The rule database 416 includes the rules used by the rule checker 306 for determining the validity of email addresses.

It is noted that the embodiments illustrated in FIG. 4 are examples and do not describe every possible embodiment. Other embodiments may utilize different modules, additional modules, fewer modules, combine the functionality of two or more modules into one, etc. The embodiments illustrated in FIG. 4 should therefore not be interpreted to be exclusive or limiting, but rather illustrative.

Figure 5:
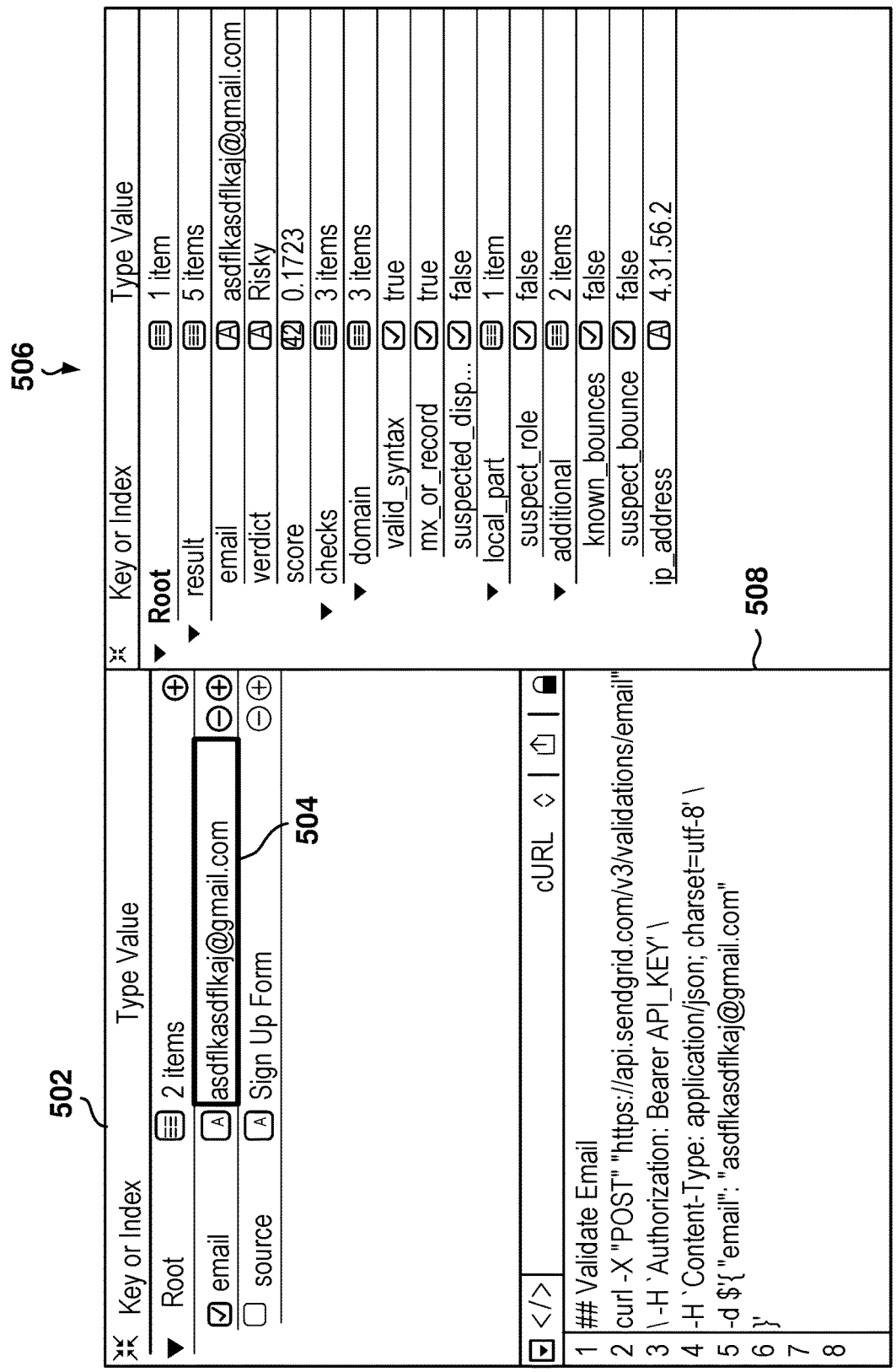
FIG. 5 is a user interface for interactively validating email addresses, according to some example embodiments.

FIG. 5 is a user interface 506 for interactively validating email addresses, according to some example embodiments. The user interface 506 includes an input section 502, that includes an email field 504 for entering the email address to be validated, a results section 506 for displaying the results of the validation, and a command section 508 that displays the commands issued to the API for validating the email address.

The results section 502 includes results and performed checks. The results include the email address being checked, a verdict (e.g., valid or invalid), the probability score that the email address is valid, a local part (e.g., main portion of the email address), and a host or domain associated with the email address.

The checks include domain checks associated with the domain in the email address (e.g., valid address syntax flag, suspected disposable address), a local part (e.g., a suspected role address such as admin@corporationA.com), and additional checks, such as whether the email address has bounced in the past. It is noted that disposable email addresses are detected because there are a few services that provide the disposable email addresses using known domains.

In the illustrated example, the email address corresponds to a keyboard smash and the results show that, although the syntax is proper, the probability 0.1723 of a valid email address is very low.

In some example embodiments, the machine-learning model was trained with sample data corresponding to known keyboard smashes. The trained model is then able to predict when an email address is a keyboard smash.

FIG. 6 shows the results of validating a disposable email address, according to some example embodiments. In the illustrated example, the user has entered a request to check the email address joe@mailinator.com and the results show that the email address is probably invalid and a true value for the flag that it is a suspected disposable address.

FIG. 7 shows results after validating an email address with a typo in the domain name, according to some example embodiments. In the illustrated example, the user has incorrectly typed the domain name. In this case, the results show a verdict that it is a risky email address with the validity probability of less than 1%.

In some example embodiments, the machine-learning model is trained with known typos in the email addresses to be able to search for typographical errors.

FIG. 8 shows results after validating a valid email address, according to some example embodiments. After using the email-address validator for a while, it was observed that some email addresses, although valid, generated different validity scores. The question raised was, why do some email addresses appear to be "more valid" than others?

In the illustrated example, the email address scottkawai@gmail.com was checked and the answer was that it was a valid email address with a 97% probability. This shows that the machine-learning model assigned a high level of confidence that this email address is valid.

FIG. 9 shows results after validating another email address, according to some example embodiments. In this example, the email address from FIG. 8 was changed to a different domain, and a check was made for the email address scottkawai@sendgrid.com, which is also a valid email address.

In this case, the prediction was that the email address was valid but only with a score of 68%. After some analysis, it was determined that the machine-learning model had found a pattern where some employees had left the company (SendGrid), which meant that their email addresses were no longer valid causing them to bounce. A possible explanation is that Gmail accounts tend to belong to private users and are kept for a long time, while corporate accounts belong to employees and employees sometimes change jobs, which means that corporate accounts do not have the same longevity as Gmail accounts. Therefore, corporate accounts may have a higher probability of bouncing than Gmail accounts; therefore, the probability of validity was lowered.

Figure 10:
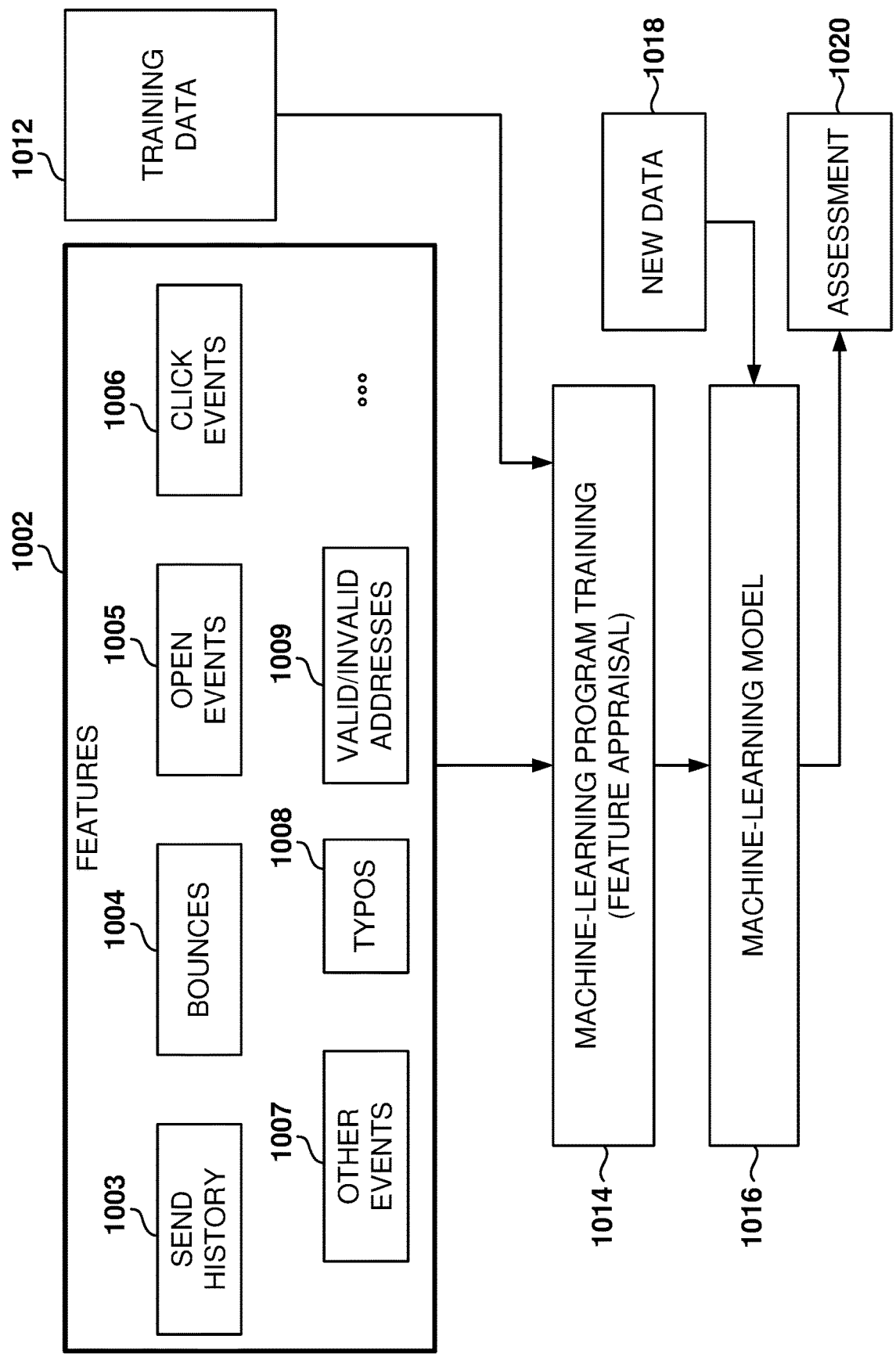
FIG. 10 illustrates the training and use of a machine-learning model, according to some example embodiments.

FIG. 10 illustrates the training and use of a machine-learning model, according to some example embodiments. In some example embodiments, machine-learning programs (MLPs), also referred to as machine-learning algorithms or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 1012 in order to make data-driven predictions or decisions expressed as outputs or assessments 1020. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide a validity score (e.g., a number from 1 to 100) indicating the probability that an email address is valid. The machine-learning algorithms utilize the training data 1012 to find correlations among identified features 1002 that affect the outcome.

In some example embodiments, the training data includes one or more of email addresses of emails sent in the past with an indication if the email addresses were valid or invalid, bounced email addresses, typographical errors in the email addresses, keyboard smash examples for the email addresses, click events when the user clicked on a link embedded in the email, open events when the user opened the email, known valid domain names, a list of valid email addresses, a list of invalid email addresses, etc. In some example environments, valid email addresses are defined as emails addresses that have been opened or clicked, and invalid email addresses are defined as email addresses that were dropped or bounced with no engagement in the past.

The machine-learning algorithms utilize features 1002 for analyzing the data to generate assessments 1020. A feature 1002 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 1002 may be of different types and may include one or more of sending history 1003 (including emails sent in the past), past bounces 1004 (bounces from the emails sent), open events 1005 (e.g., when the user clicked to open the email), click events 1006 (e.g., when the user clicked on the link embedded in the email), other events 1007, typographical errors 1008 (e.g., that caused an email to be undeliverable or delivered to the wrong person), a list of valid email addresses, a list of invalid email addresses, etc.

The machine-learning algorithms utilize the training data 1012 to find correlations among the identified features 1002 that affect the outcome or assessment 1020. In some example embodiments, the training data comprises labeled data with examples of values for the features 1002 and labels indicating the outcome, such as valid or invalid email address, email address bounced, typographical errors, etc.

With the training data 1012, the machine-learning tool is trained at operation 1014. The machine-learning tool appraises the value of the features to find the correlations within the training data 1012. The result of the training is the machine-learning model 1016.

When the machine-learning model 1016 is used to perform an assessment, new data 1018 is provided as an input to the trained machine-learning model 1016, and the machine-learning model 1016 generates the assessment 1020 as output (e.g., valid or invalid, validity score).

In some example embodiments, the data is formatted for the machine-learning model. A single email address is converted to a matrix, and the matrix is used as the input data to a neural network. To create the matrix 74 unique characters are defined:

'\t\n\x0b\x0c\r !"#$%&\'( )*+,–./0123456789:;<=>?@ [\\]^_'abcdefghijklmnopqrstuvwxyz{|}~'

Further, a character-index vocabulary is created, which is a dictionary mapping each of the 74 characters to an index from 1 to 74. Each email address gets transformed into a 254×74 matrix, and 254 bytes is the maximum email-address length. The email address is represented by character vectors for each character in the email address in the 254×74 matrix. The later rows in this matrix are typically 0 because most emails are not as long as the maximum email length allowed of 254.

In some example embodiments, the machine-learning model is a neural network with both convolutional and recurrent layers. Convolutional layers are typically used on image data to capture meaningful patterns in a matrix of data, while recurrent layers are typically used on time series and text data to capture the meaningful order of the data.

Figure 11:
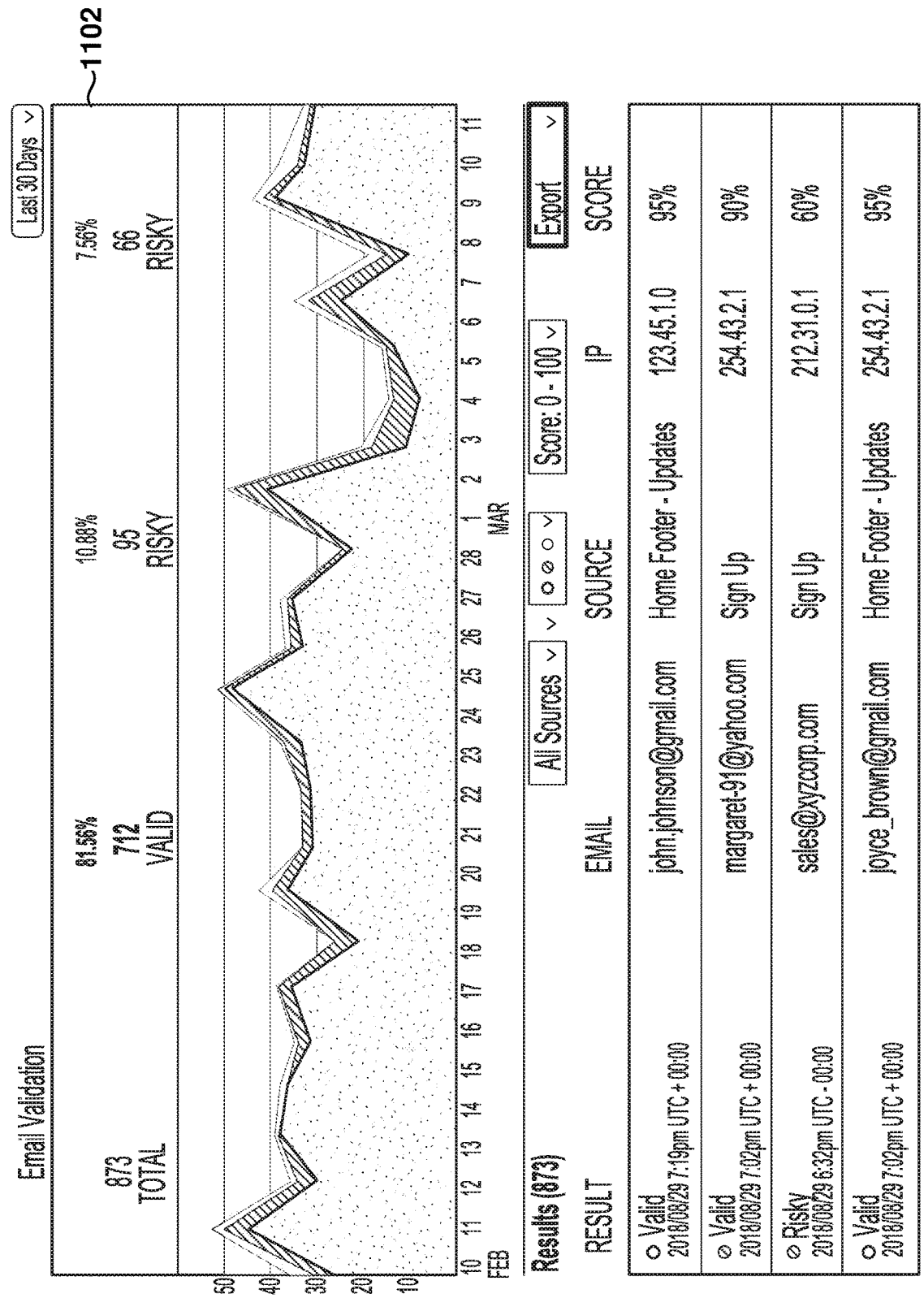
FIG. 11 is a user interface for showing email-validation statistics, according to some example embodiments.

FIG. 11 is a user interface for showing email-validation statistics, according to some example embodiments. The email-address validator includes a user interface that provides information, such as a list of email validation results, indicating validity and score.

The user interface 1102 includes statistics on email validations, including the total number of requests, how many were valid, how many were risky, and how many were very risky. A chart is presented including these values, in cumulative form, over a period of time (e.g., a month).

Further, a list is presented in tabular form with the email address validated and related information. An option is provided to scroll up and down the list to see additional email addresses, and if the user clicks on one of the emails, additional information is presented.

Figure 12:
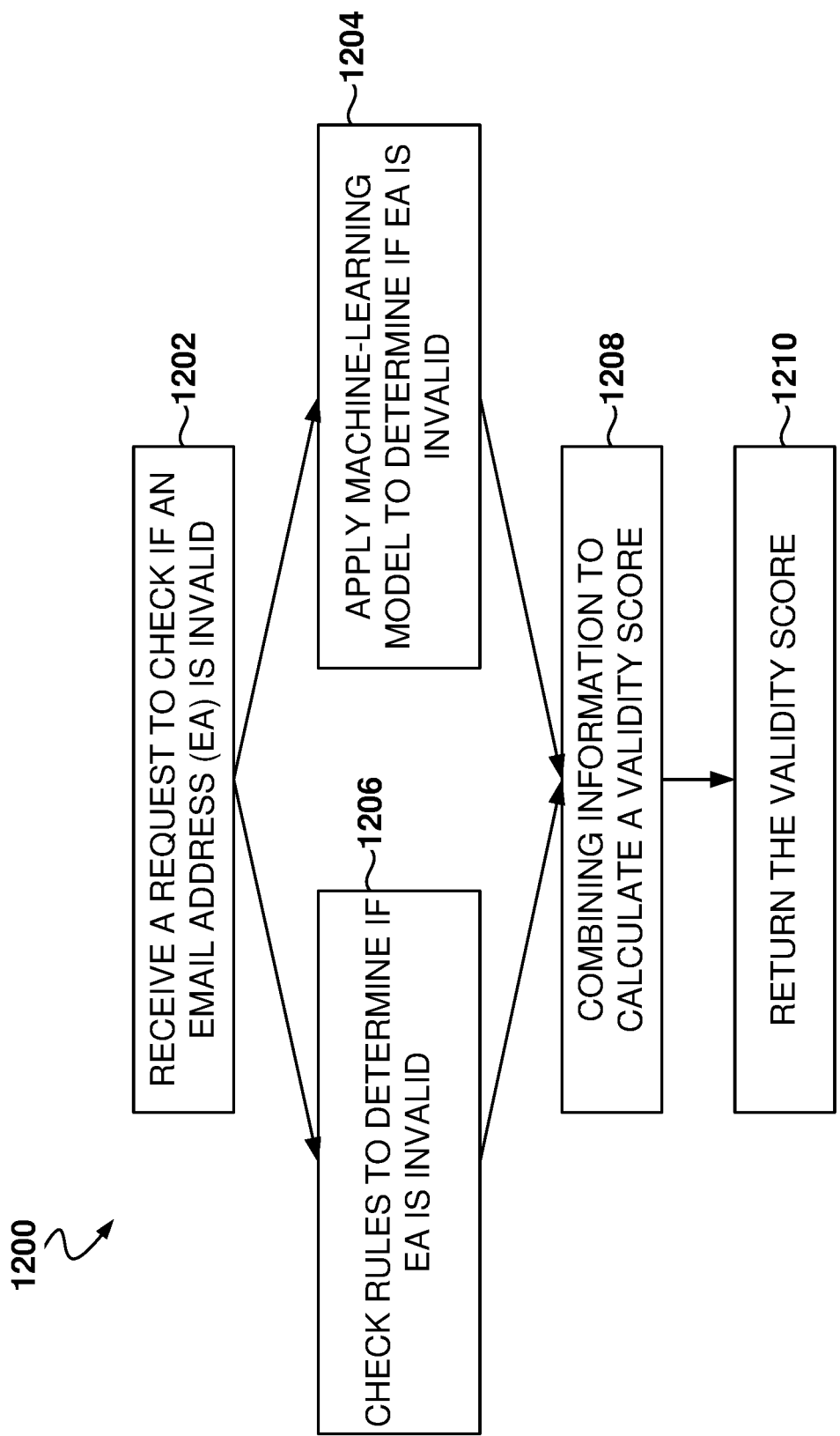
FIG. 12 is a flowchart of a method for validating if an email address is a valid email address, according to some example embodiments.

FIG. 12 is a flowchart of a method 1200 for validating if an email address is a valid email address, according to some example embodiments. While the various operations in this flowchart are presented and described sequentially, one of ordinary skill will appreciate that some or all of the operations may be executed in a different order, be combined or omitted, or be executed in parallel.

At operation 1202, a request is received to check if an email address is valid. From operation 1202, the method flows to operations 1204 and 1206, which may be executed in parallel or serially. Operation 1206 is for checking rules to determine if the email address is invalid, and operation 1204 is for applying a machine-learning model to determine if the email address is invalid.

At operation 1208, the information is combined to calculate a validity score, and at operation 1210, the validity score is returned to the requester.

Some of the benefits provided by the email validator include decreasing the rate of bounced emails, improving the reputation of senders with mailbox providers, increasing the number of quality email address captures through in-form validation, and optimizing engagement with customers, that turns into an increased return on investment.

Figure 13:
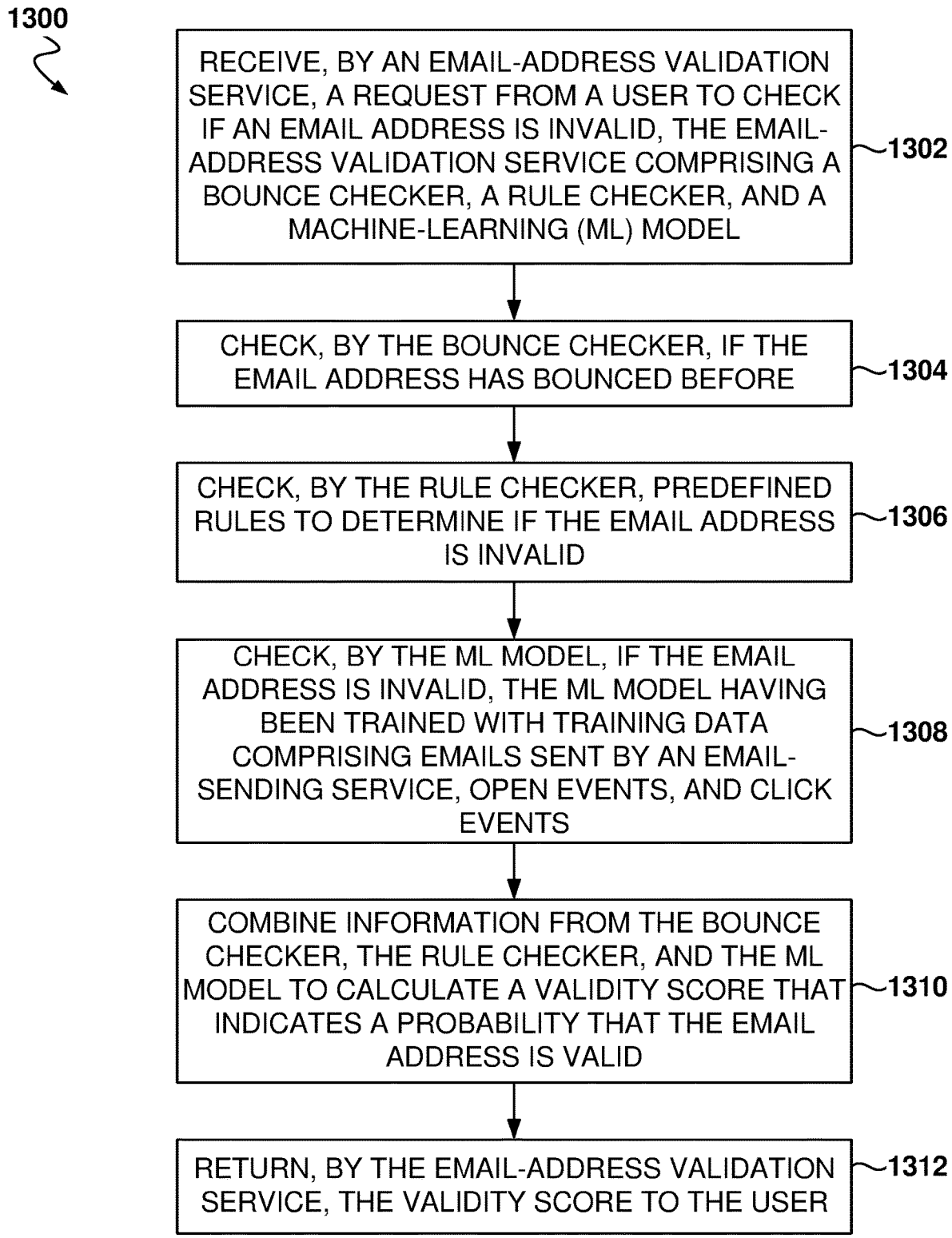
FIG. 13 is a flowchart of a method for validating if an email address is a valid email address, according to some example embodiments.

FIG. 13 is a flowchart of a method 1300 for validating if an email address is a valid email address, according to some example embodiments. While the various operations in this flowchart are presented and described sequentially, one of ordinary skill will appreciate that some or all of the operations may be executed in a different order, be combined or omitted, or be executed in parallel.

Operation 1302 is for receiving, by an email-address validation service, a request from a user to check if an email address is invalid. The email-address validation service comprises a bounce checker, a rule checker, and a machine-learning (ML) model.

At operation 1304 the bounce checker checks if the email address has bounced before. At operation 1306 the rule checker checks predefined rules to determine if the email address is invalid.

At operation 1308, the ML model checks if the email address is invalid. The ML model has been trained with training data comprising emails sent by an email-sending service with an indication if the email address of the emails sent was valid or invalid, open events when users opened the emails sent, and click events when users selected a link embedded in the emails sent.

At operation 1310, the information from the bounce checker, the rule checker, and the ML model is combined to calculate a validity score that indicates a probability that the email address is valid.

From operation 1310, the method 1300 flows to operation 1312, where the email-address validation service returns the validity score to the user.

In one example, the ML model is trained with data indicative of keyboard smashes, wherein the ML model predicts email address that are keyboard smashes. In some example embodiments, additional training data is generated by taking known valid email addresses and inserting simulated keyboard smashing or random characters to create more cases of incorrect email addresses for the ML model to learn from.

In one example, the ML model is trained with data indicative of typographical errors, wherein the ML model predicts email address that have typographical errors.

In one example, the training data includes sample valid email addresses and invalid email addresses, the sample invalid email addresses including bounced email addresses, typographical errors, and keyboard smashes.

In one example, the ML model is based on features that include sending history, past bounces, open events, click events, and typographical errors.

In one example, the email-address validation service serves a plurality of clients, wherein each client from the plurality of clients uses training data for emails sent by the client and each client has its own ML model based on the client's training data.

In one example, combining the information comprises combining scores obtained by the bounce checker, the rule checker, and the ML model such that if any score indicates a high probability of invalidity, the validity score will indicate a high probability of invalidity.

In one example, the rule checker applies a plurality of rules to determine if an email address is invalid, the rules including missing @ sign, missing domain, invalid domain, address in blacklist, and address for a domain that provides disposable email addresses.

In one example, the method 1300 further comprises providing, by the email-address validation service, a user interface for validating the email address, the user interface including an input section for entering the email address and a results section for showing results.

In one example, the results section includes results and performed checks, the results including whether the email address is valid or invalid, a probability score that the email address is valid, a local part of the email address, and domain associated with the email address, wherein the performed checks include domain checks associated with the domain in the email address, checks associated with a local part, and an indication if the email address has bounced in the past.

Another general aspect is for a system that includes one or more computer processors and a memory comprising instructions for an email-address validation service that includes a bounce checker, a rule checker, and a machine-learning (ML) model. The instructions, when executed by the one or more computer processors, cause the one or more computer processors to perform operations comprising: receiving a request from a user to check if an email address is invalid; checking, by the bounce checker, if the email address has bounced before; checking, by the rule checker, predefined rules to determine if the email address is invalid; checking, by the ML model, if the email address is invalid, the ML model having been trained with training data indicating if email addresses, of emails sent by an email-sending service were valid; combining, by the email-address validation service, information from the bounce checker, the rule checker, and the ML model to calculate a validity score that indicates a probability that the email address is valid; and returning, by the email-address validation service, the validity score to the user.

In yet another general aspect, a machine-readable storage medium (e.g., a non-transitory storage medium) includes instructions that, when executed by a machine, cause the machine to perform operations comprising: receiving, by an email-address validation service, a request from a user to check if an email address is invalid, the email-address validation service comprising a bounce checker, a rule checker, and a machine-learning (ML) model; checking, by the bounce checker, if the email address has bounced before; checking, by the rule checker, predefined rules to determine if the email address is invalid; checking, by the ML model, if the email address is invalid, the ML model having been trained with training data indicating if email addresses, of emails sent by an email-sending service were valid; combining information from the bounce checker, the rule checker, and the ML model to calculate a validity score that indicates a probability that the email address is valid; and returning, by the email-address validation service, the validity score to the user.

Figure 14:
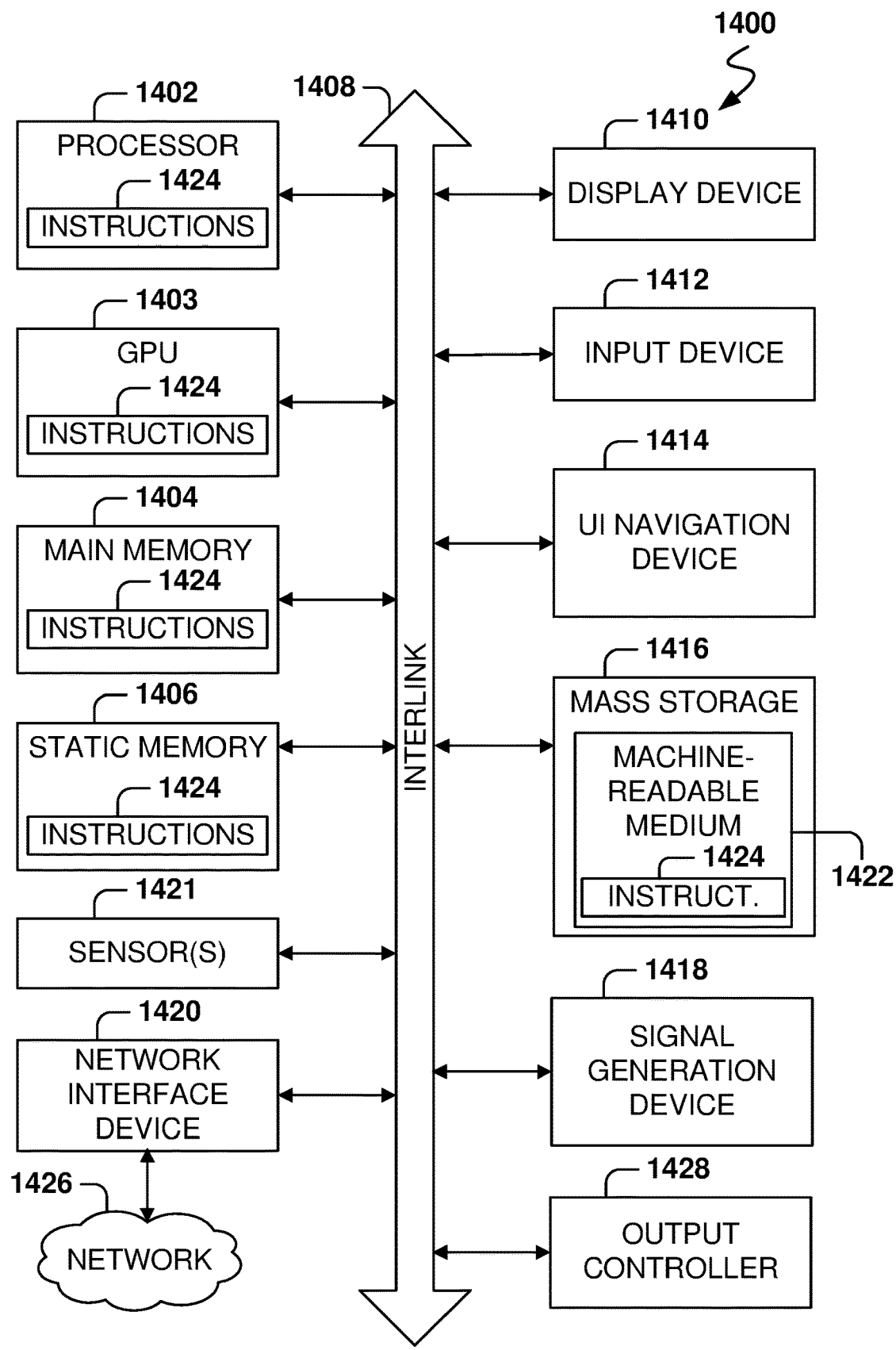
FIG. 14 is a block diagram illustrating an example of a machine upon or by which one or more example process embodiments described herein may be implemented or controlled.

FIG. 14 is a block diagram illustrating an example of a machine 1400 upon or by which one or more example process embodiments described herein may be implemented or controlled. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in a peer-to-peer (P2P) (or other distributed) network environment. Further, while only a single machine 1400 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1400 may include a hardware processor 1402 (e.g., a central processing unit (CPU), a hardware processor core, or any combination thereof), a graphics processing unit (GPU) 1403, a main memory 1404, and a static memory 1406, some or all of which may communicate with each other via an interlink (e.g., bus) 1408. The machine 1400 may further include a display device 1410, an alphanumeric input device 1412 (e.g., a keyboard), and a user interface (UI) navigation device 1414 (e.g., a mouse). In an example, the display device 1410, alphanumeric input device 1412, and UI navigation device 1414 may be a touch screen display. The machine 1400 may additionally include a mass storage device (e.g., drive unit) 1416, a signal generation device 1418 (e.g., a speaker), a network interface device 1420, and one or more sensors 1421, such as a Global Positioning System (GPS) sensor, compass, accelerometer, or another sensor. The machine 1400 may include an output controller 1428, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1416 may include a machine-readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within the static memory 1406, within the hardware processor 1402, or within the GPU 1403 during execution thereof by the machine 1400. In an example, one or any combination of the hardware processor 1402, the GPU 1403, the main memory 1404, the static memory 1406, or the mass storage device 1416 may constitute machine-readable media.

While the machine-readable medium 1422 is illustrated as a single medium, the term "machine-readable medium" may include a single medium, or multiple media, (e.g., a centralized or distributed database, and/or associated caches and servers) configured to store the one or more instructions 1424.

The term "machine-readable medium" may include any medium that is capable of storing, encoding, or carrying instructions 1424 for execution by the machine 1400 and that cause the machine 1400 to perform any one or more of the techniques of the present disclosure, or that is capable of storing, encoding, or carrying data structures used by or associated with such instructions 1424. Non-limiting machine-readable medium examples may include solid-state memories, and optical and magnetic media. In an example, a massed machine-readable medium comprises a machine-readable medium 1422 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1424 may further be transmitted or received over a communications network 1426 using a transmission medium via the network interface device 1420.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
 receiving, by an email-address validation service, a request from a user to check if an email address is invalid, the email-address validation service comprising a bounce checker, a rule checker, and a machine-learning (ML) model;
 checking, by the bounce checker, if the email address has bounced before;
 checking, by the rule checker, predefined rules to determine if the email address is invalid;
 checking, by the ML model, if the email address is invalid, the ML model having been trained with training data comprising emails sent by an email-sending service with an indication if the email address of the emails sent was valid or invalid, open events when users opened the emails sent, and click events when users selected a link embedded in the emails sent;

combining information from the bounce checker, the rule checker, and the ML model to calculate a validity score that indicates a probability that the email address is valid; and returning, by the email-address validation service, the validity score to the user.

2. The method as recited in claim 1, wherein the ML model is trained with data indicative of keyboard smashes, wherein the ML model predicts email address that are keyboard smashes.

3. The method as recited in claim 1, wherein the ML model is trained with data indicative of typographical errors, wherein the ML model predicts email address that have typographical errors.

4. The method as recited in claim 1, wherein the training data includes sample valid email addresses and invalid email addresses, the sample invalid email addresses including bounced email addresses, typographical errors, and keyboard smashes.

5. The method as recited in claim 1, wherein the ML model is based on features that include sending history, past bounces, open events, click events, and typographical errors.

6. The method as recited in claim 1, wherein the email-address validation service serves a plurality of clients, wherein each client from the plurality of clients uses training data for emails sent by the client and each client has its own ML model based on the client's training data.

7. The method as recited in claim 1, wherein combining the information comprises:

combining scores obtained by the bounce checker, the rule checker, and the ML model such that if any score indicates a high probability of invalidity, the validity score will indicate a high probability of invalidity.

8. The method as recited in claim 1, wherein the rule checker applies a plurality of rules to determine if an email address is invalid, the rules including missing @ sign, missing domain, invalid domain, address in blacklist, and address for a domain that provides disposable email addresses.

9. The method as recited in claim 1, further comprising:

providing, by the email-address validation service, a user interface for validating the email address, the user interface including an input section for entering the email address and a results section for showing results.

10. The method as recited in claim 9, wherein the results section includes results and performed checks, the results including whether the email address is valid or invalid, a probability score that the email address is valid, a local part of the email address, and domain associated with the email address, wherein the performed checks include domain checks associated with the domain in the email address, checks associated with a local part, and an indication if the email address has bounced in the past.

11. A system comprising:

a memory comprising instructions for an email-address validation service that includes a bounce checker, a rule checker, and a machine-learning (ML) model; and one or more computer processors, wherein the instructions, when executed by the one or more computer processors, cause the system to perform operations comprising:

receiving a request from a user to check if an email address is invalid;

checking, by the bounce checker, if the email address has bounced before;

checking, by the rule checker, predefined rules to determine if the email address is invalid;

checking, by the ML model, if the email address is invalid, the ML model having been trained with training data comprising emails sent by an email-sending service with an indication if the email address of the emails sent was valid or invalid, open events when users opened the emails sent, and click events when users selected a link embedded in the emails sent;

combining, by the email-address validation service, information from the bounce checker, the rule checker, and the ML model to calculate a validity score that indicates a probability that the email address is valid; and returning, by the email-address validation service, the validity score to the user.

12. The system as recited in claim 11, wherein the ML model is trained with data indicative of keyboard smashes, wherein the ML model predicts email address that are keyboard smashes, wherein the ML model is trained with data indicative of typographical errors, wherein the ML model predicts email address that have typographical errors.

13. The system as recited in claim 11, wherein the training data includes sample valid email addresses and invalid email addresses, the sample invalid email addresses including bounced email addresses, typographical errors, and keyboard smashes.

14. The system as recited in claim 11, wherein the ML model is based on features that include sending history, past bounces, open events, click events, and typographical errors.

15. The system as recited in claim 11, wherein the email-address validation service serves a plurality of clients, wherein each client from the plurality of clients uses training data for emails sent by the client and each client has its own ML model based on the client's training data.

16. A non-transitory machine-readable storage medium including instructions that, when executed by a machine, cause the machine to perform operations comprising:

receiving, by an email-address validation service, a request from a user to check if an email address is invalid, the email-address validation service comprising a bounce checker, a rule checker, and a machine-learning (ML) model;

checking, by the bounce checker, if the email address has bounced before;

checking, by the rule checker, predefined rules to determine if the email address is invalid;

checking, by the ML model, if the email address is invalid, the ML model having been trained with training data comprising emails sent by an email-sending service with an indication if the email address of the emails sent was valid or invalid, open events when users opened the emails sent, and click events when users selected a link embedded in the emails sent;

combining information from the bounce checker, the rule checker, and the ML model to calculate a validity score that indicates a probability that the email address is valid; and returning, by the email-address validation service, the validity score to the user.

17. The non-transitory machine-readable storage medium as recited in claim 16, wherein the ML model is trained with data indicative of keyboard smashes, wherein the ML model predicts email address that are keyboard smashes, wherein the ML model is trained with data indicative of typographical errors, wherein the ML model predicts email address that have typographical errors.

18. The non-transitory machine-readable storage medium as recited in claim 16, wherein the training data includes sample valid email addresses and invalid email addresses, the sample invalid email addresses including bounced email addresses, typographical errors, and keyboard smashes.

19. The non-transitory machine-readable storage medium as recited in claim 16, wherein the ML model is based on features that include sending history, past bounces, open events, click events, and typographical errors.

20. The non-transitory machine-readable storage medium as recited in claim 16, wherein the email-address validation service serves a plurality of clients, wherein each client from the plurality of clients uses training data for email s sent by the client and each client has its own ML model based on the client's training data.

* * * * *